Sept. 12, 1961 W. H. KNIPPEL 2,999,467
RAILWAY POWER BALLASTER
Filed Sept. 27, 1957 14 Sheets-Sheet 1

Inventor
Willis H. Knippel
By Wayne Morris Russell
Attorney

Sept. 12, 1961  W. H. KNIPPEL  2,999,467
RAILWAY POWER BALLASTER
Filed Sept. 27, 1957  14 Sheets-Sheet 2

Inventor
Willis H. Knippel
By Wayne Morris Russell
Attorney

Sept. 12, 1961  W. H. KNIPPEL  2,999,467
RAILWAY POWER BALLASTER
Filed Sept. 27, 1957  14 Sheets-Sheet 3

Inventor
Willis H. Knippel
By Wayne Morris Russell
Attorney

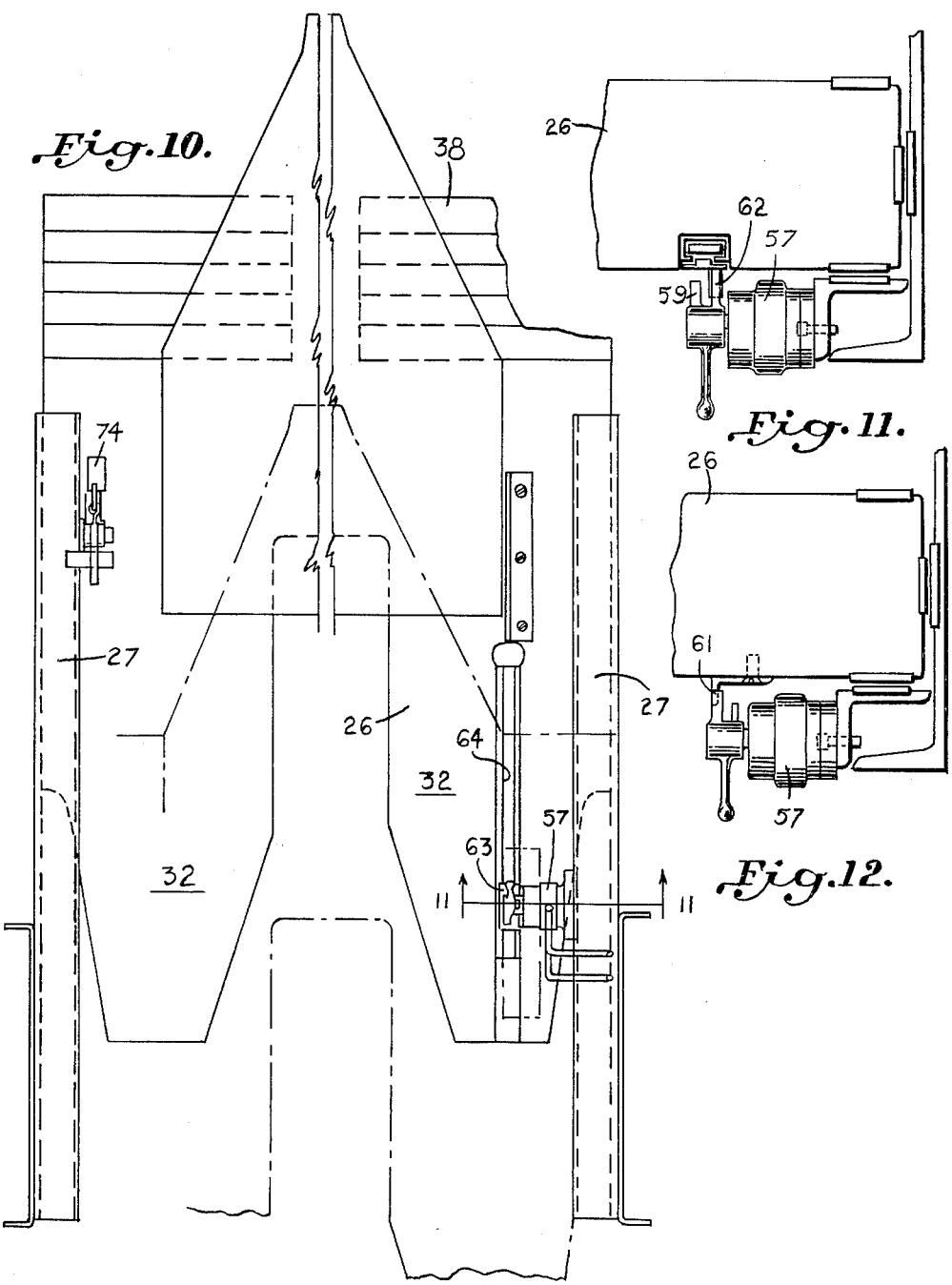

Sept. 12, 1961 W. H. KNIPPEL 2,999,467
RAILWAY POWER BALLASTER
Filed Sept. 27, 1957 14 Sheets-Sheet 11
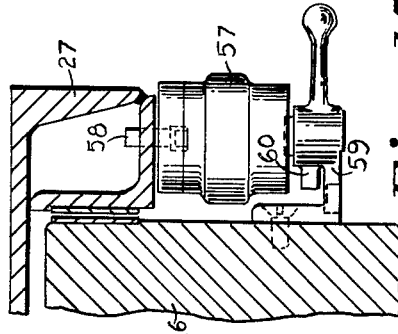
Fig. 13.
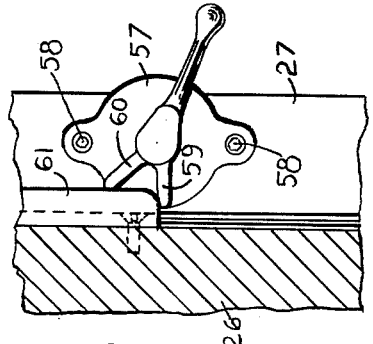
Fig. 14.
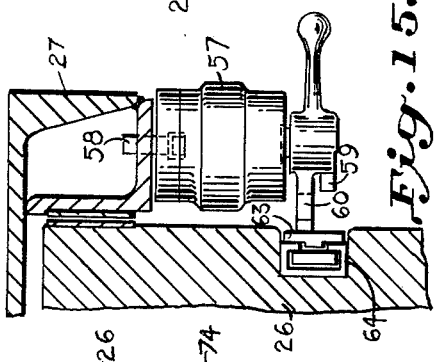
Fig. 15.
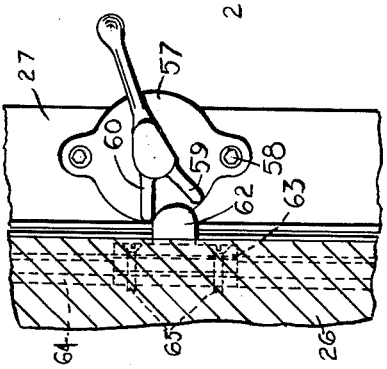
Fig. 16.
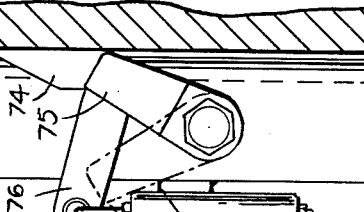
Fig. 17.
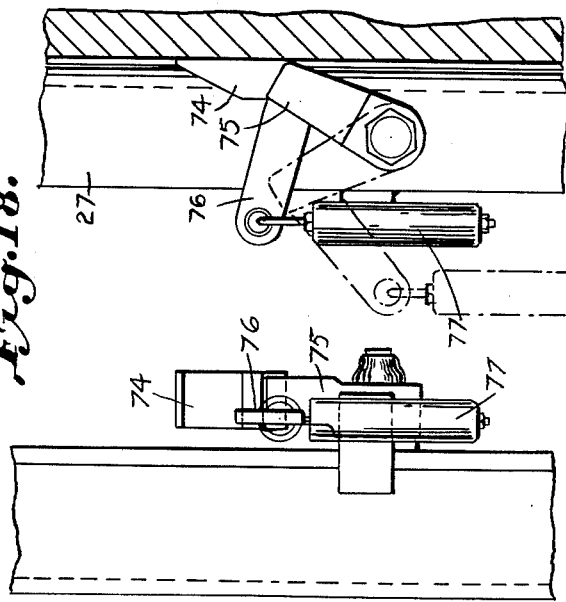
Fig. 18.
Fig. 19.
Inventor
Willis H. Knippel
By Wayne Morris Russell
Attorney Sept. 12, 1961
W. H. KNIPPEL
2,999,467
RAILWAY POWER BALLASTER
Filed Sept. 27, 1957
14 Sheets-Sheet 12
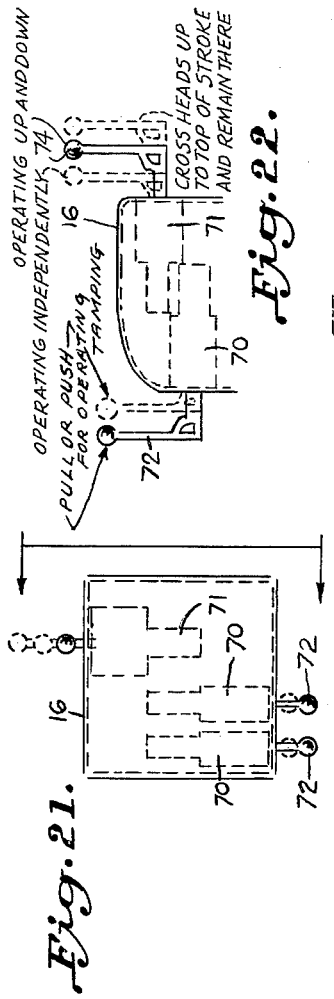
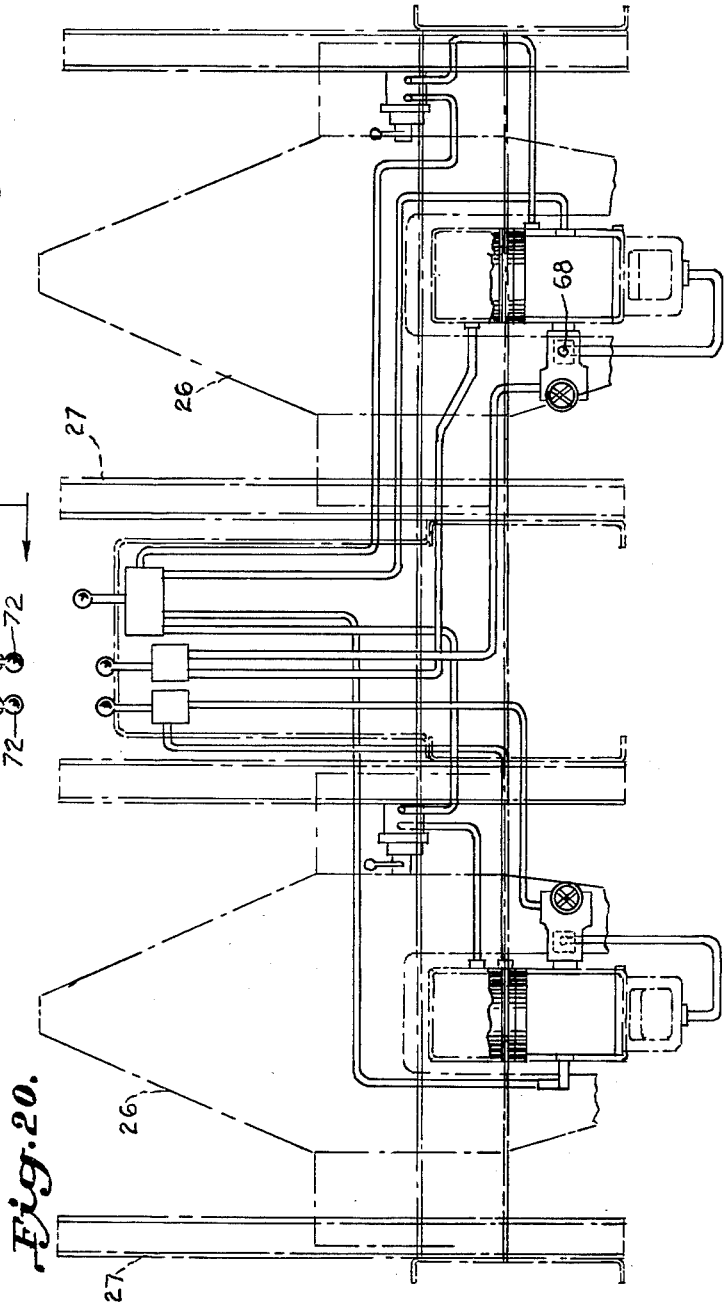
Inventor
Willis H. Knippel
By Wayne Morris Russell
Attorney

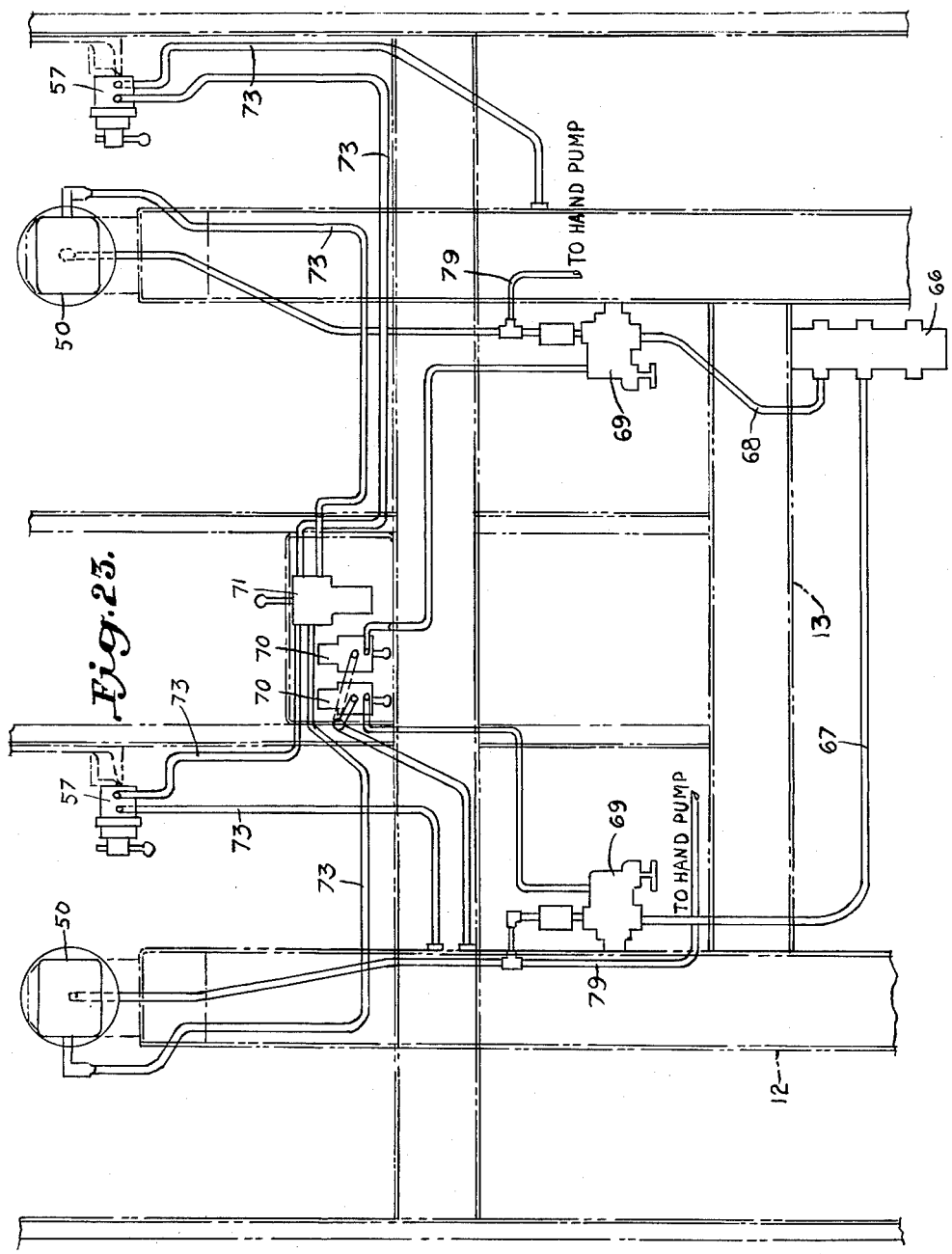

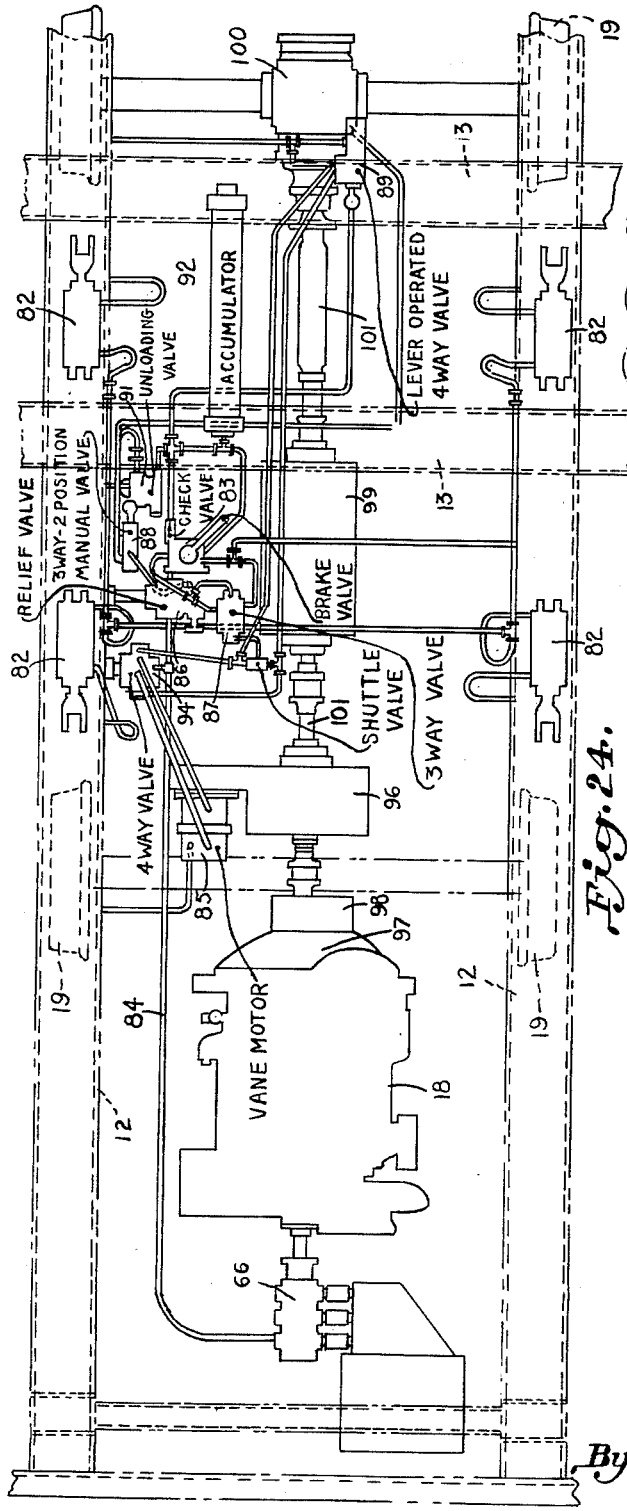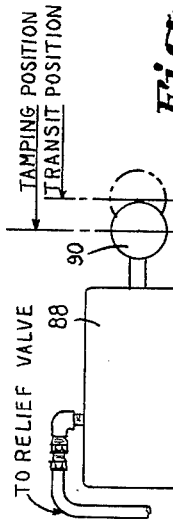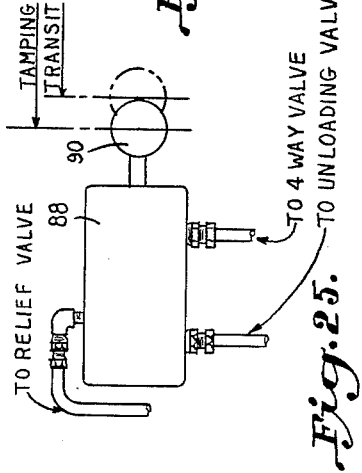

2,999,467
RAILWAY POWER BALLASTER
Willis H. Knippel, Palos Park, Ill., assignor to Pullman Incorporated, a corporation of Delaware
Filed Sept. 27, 1957, Ser. No. 686,768
4 Claims. (Cl. 104—12)

This invention relates to a railway ballast tamping machine for packing the ballast under the ties of a railway road bed and in the cribs between the ties.

More specifically the invention relates to a railway power ballaster having a free falling drop-head actuating tamping bars at opposite sides of each rail of the railway and wherein a drop-head and tamping mechanism is provided adjacent each such rail adapted to be operated individually whereby the ballast under a tie may be tamped separately adjacent each rail or simultaneously at both rails.

The primary purpose of the invention is the provision of a twin drop-head power ballaster with the heads and tamping mechanism in front of the machine adapted to tamp the ballast individually under each rail or simultaneously under both rails.

An important object of the invention is to provide a twin-drop-head power ballaster having hydraulic mechanism for lifting the drop-heads simultaneously or individually and permitting free fall of the drop-heads with minimum back pressure.

Another object of the invention is the provision of an hydraulic actuated twin drop-head power ballaster wherein the drop-heads may be synchronized for combined operation or actuated out of phase for completely individual operation of the respective drop-heads and which may be set for fully automatic operation of the drop-heads where repeated tamping blows may be required.

A further object of the invention is to provide a twin drop-head power ballaster having one or more free falling drop-heads wherein the height of the free fall may be adjusted to provide an infinitely variable stroke within the minimum and maximum limits of the total range of vertical movement of the drop-heads.

A still further object of the invention is the provision of a twin-drop-head power ballaster having one or more free falling drop-heads wherein the drop-heads may be fixed in an inoperative position for travel of the machine including control means for the lifting of the drop-heads to stop the heads in their up position and prevent travel of the machine unless the heads are up and positive lock mechanism to prevent accidental falling of the drop-heads.

A further and important object of the invention is to provide an hydraulically actuated twin drop-head power ballaster having an hydraulic drive mechanism for propelling the machine to spot the tamping mechanism in relation to the railway ties and hydraulically actuated brakes wherein the drive and brake mechanisms are interlocked for accurate control of the spotting operation.

One of the principal objects of the invention is the provision of a twin drop-head power ballaster having tamping bars actuated by the free falling of the drop-heads and wherein the tamping bars are pivotally mounted on the drop-heads and connected by linkage mechanism to the frame of the ballaster machine whereby increased horizontal motion is imparted to the bars adjacent the bottom of the tamping stroke to compact the ballast under the crosstie and wherein the tamping bars are shaped to conform to this path of movement as controlled by the linkage connections.

The foregoing and other and more specific objects of the invention are attained by the structure and arrangement illustrated in the accompanying drawings wherein—

Figure 2:
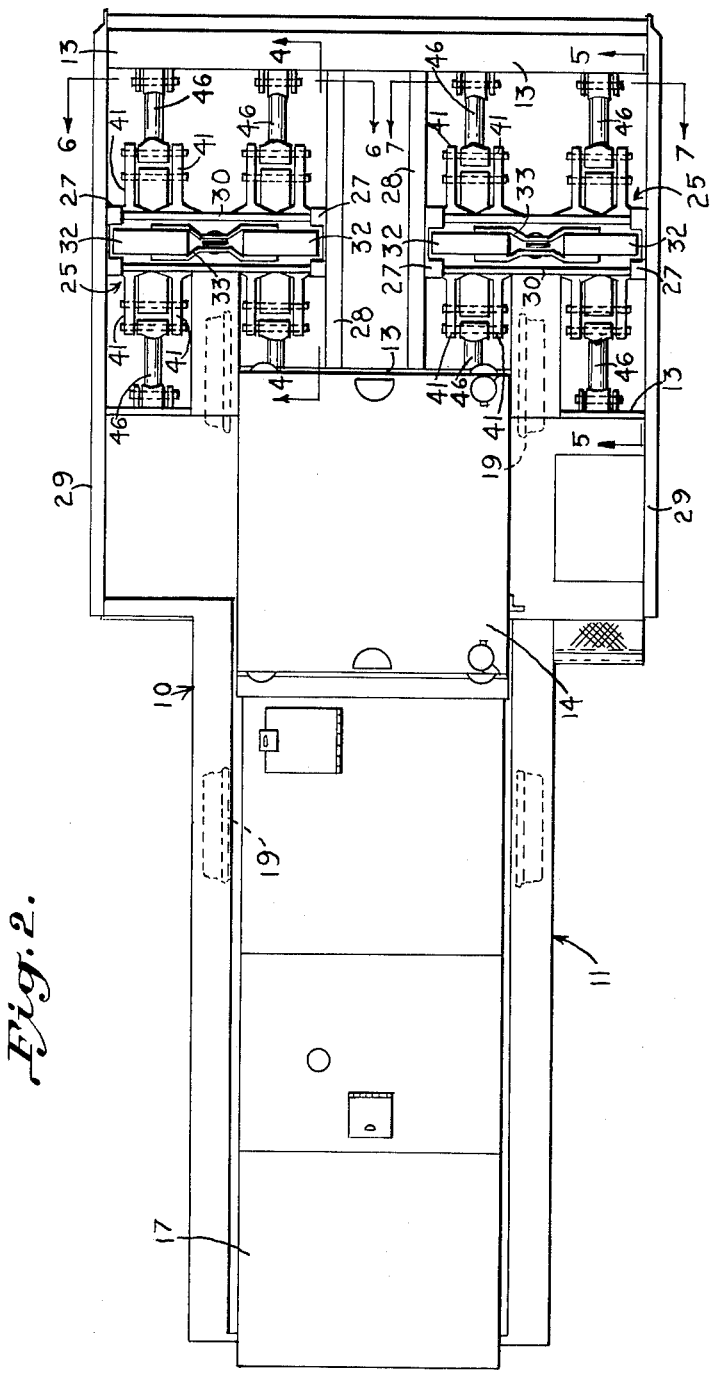
FIG. 2 is a plan view of the machine showing the individual drop-heads for the tamping mechanisms.
Figure 5:
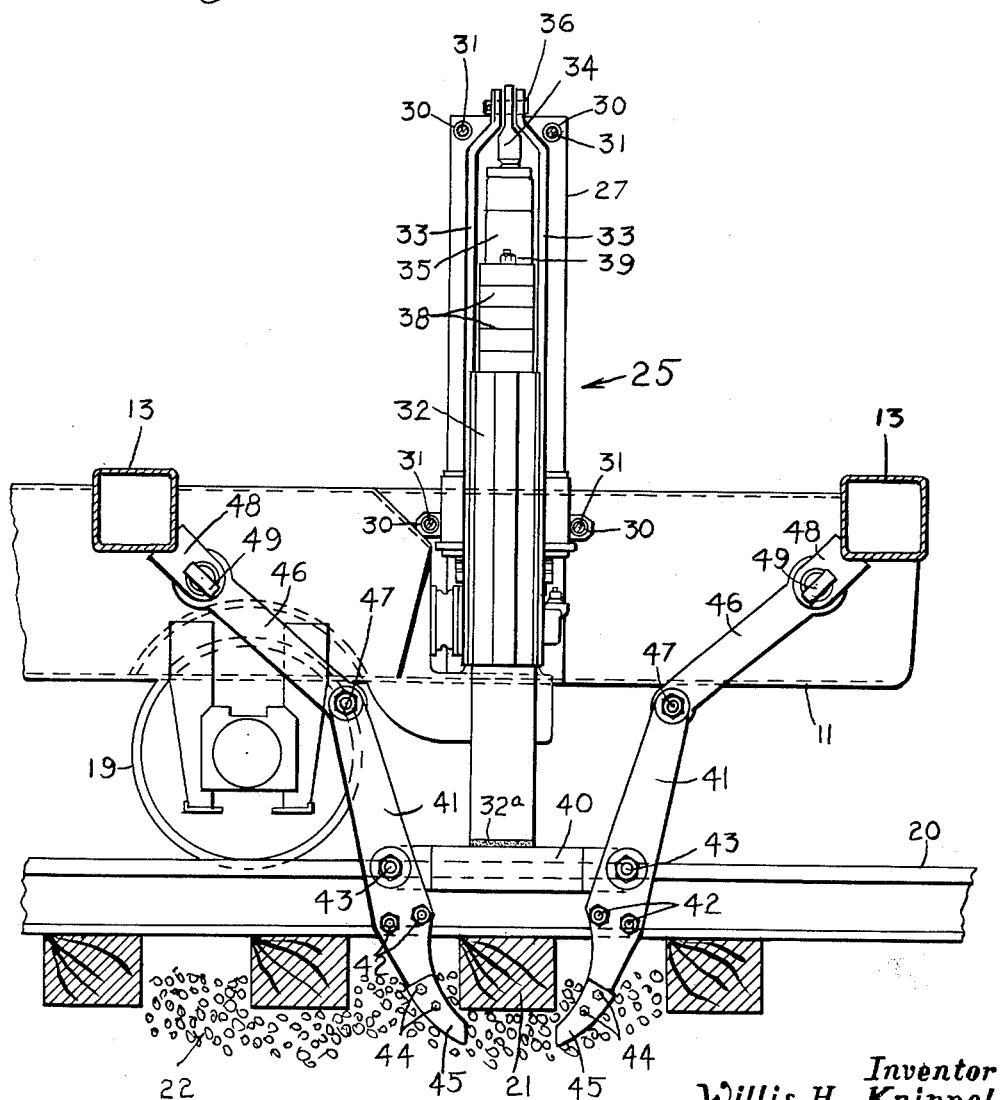
Figure 6:
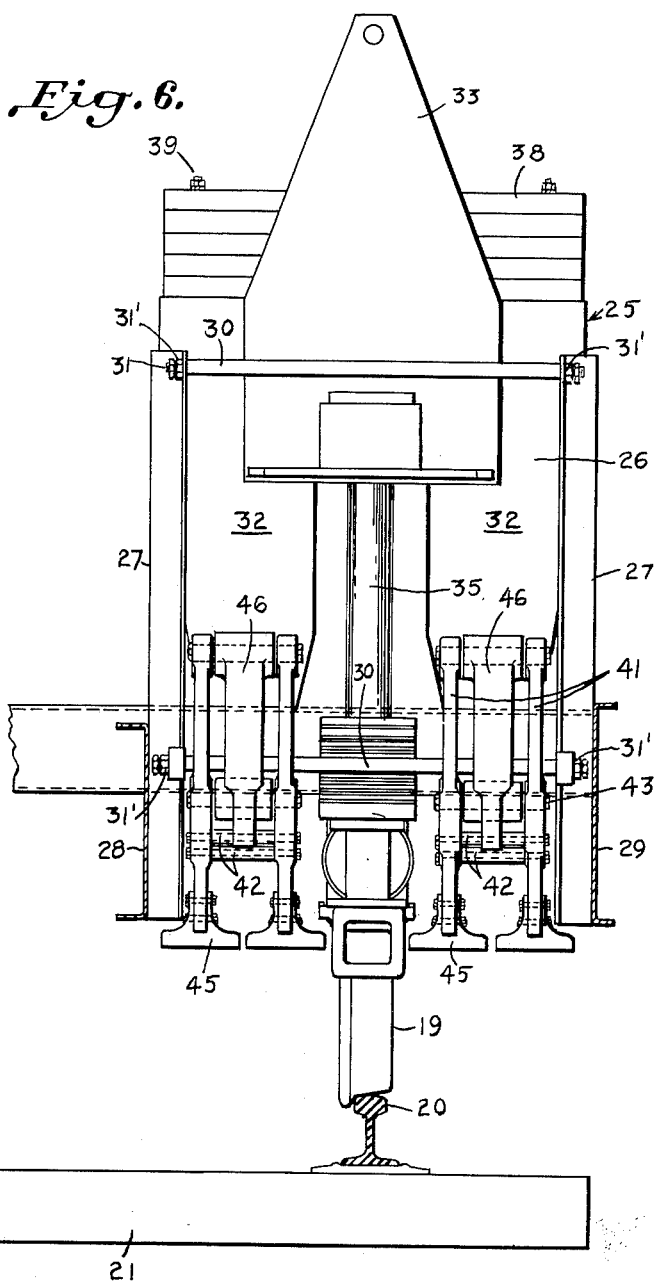
Figure 7:
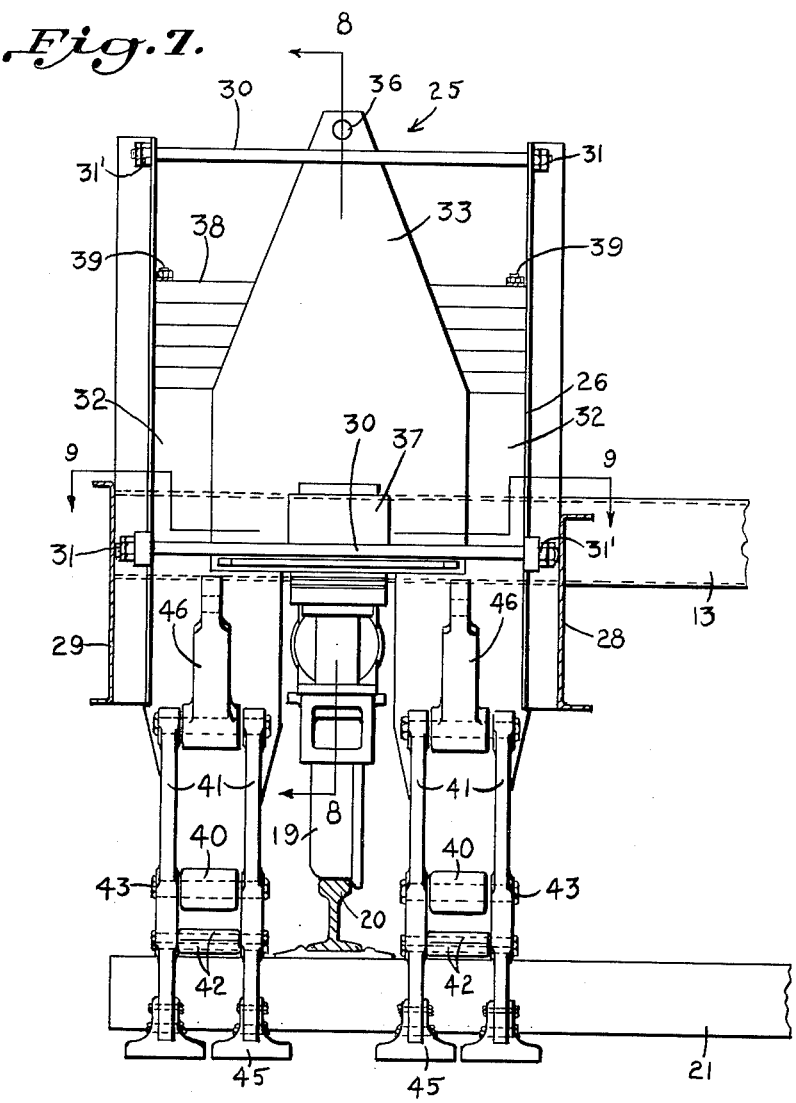
Figure 8:
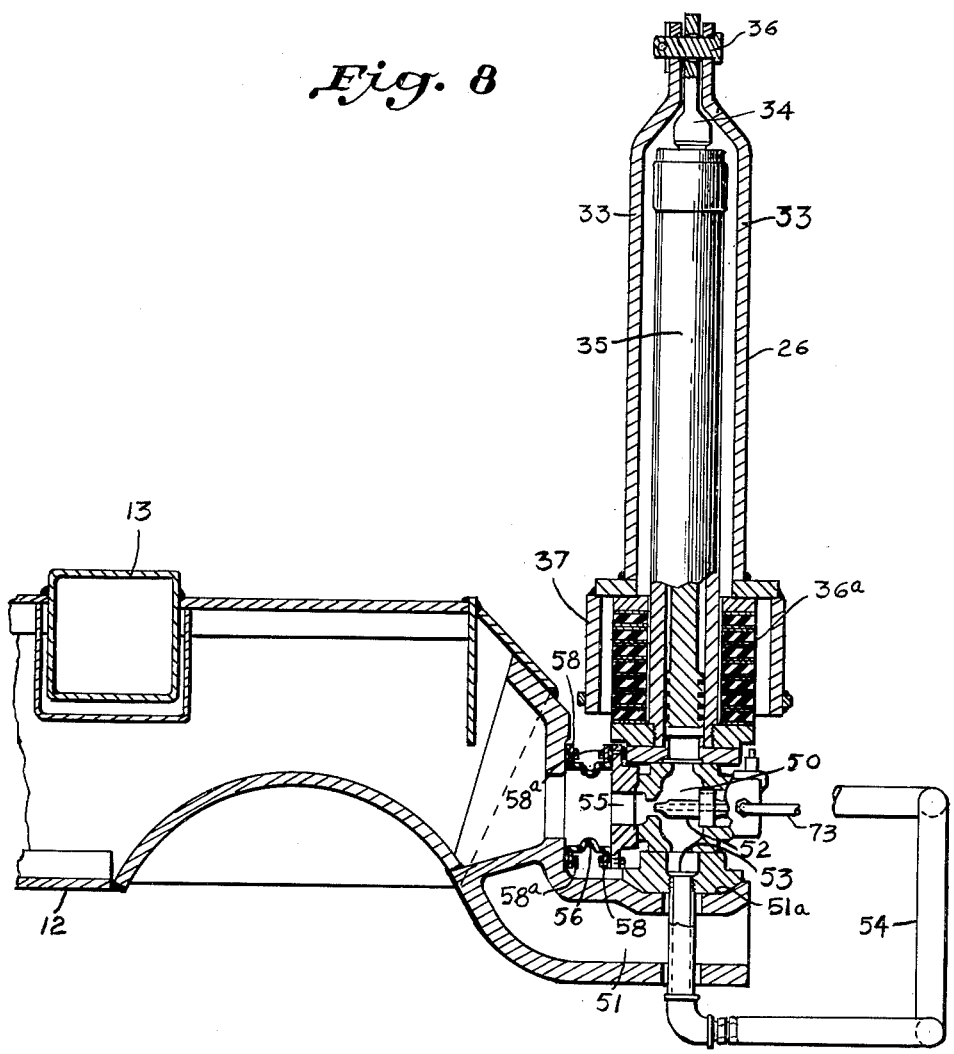
Figure 9:
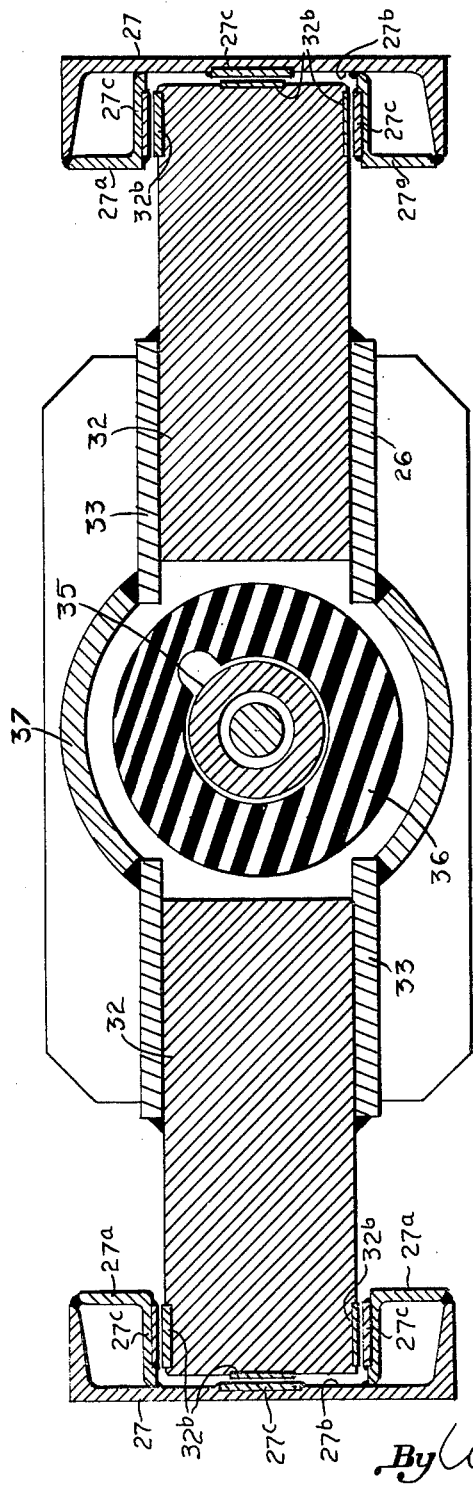

FIG. 5 also is a detail sectional view taken on the plane 5—5 of FIG. 2 and to larger scale showing a drop-head and associated tamping bar mechanism in the lowered position;

FIG. 6 is a detail transfer sectional view taken on the plane 6—6 of FIG. 2 showing a drop-head and its associated tamping bar mechanism in the raised position;

FIG. 7 also is a detail transfer sectional view taken on the plane 7—7 of FIG. 2 showing the drop-head and associated tamping bar mechanism in the down position;

FIG. 8 is a detail sectional view taken on the plane 8—8 of FIG. 7 showing the bumper for cushioning the down-stroke of the drop-head and the hydraulic connection to the sump;

FIG. 9 is a detail horizontal sectional view taken on the plane 9—9 of FIG. 7 showing the guiding arrangement for the drop-head, the cushioning device and a trip-valve mechanism actuated by the drop-head;

FIG. 10 is a view of one of the drop-heads in the raised position indicating the lowered position in broken lines and showing the arrangement for adjusting the vertical stroke of the drop-head and the positive mechanical lock for preventing accidental falling of the drop-head;

FIG. 11 is a detail plan sectional view taken on the line 11—11 of FIG. 10 showing the trip-valve actuated by the drop-head for regulating the stroke and indicating the drop-head at the top of the stroke;

FIG. 12 is a view similar to FIG. 11 but indicating the drop-head at the bottom of the stroke;

FIGS. 13 and 14 and 15 and 16 are fragmentary detail plan and elevational views respectively of the trip-valve arrangement when the drop-head is in the raised position going down and when the drop-head is in the lowered position going up;

FIGS. 17, 18 and 19 are detail side elevational plan and front elevational views of the positive mechanical lock arrangement for preventing accidental falling of the drop-head;

FIG. 20 is a diagrammatic illustration of the hydraulic circuit for the actuation of the drop-heads showing the drop-heads in vertical elevation;

FIG. 21 is a detail plan view of the control head showing the controls actuated by the operator;

FIG. 22 is a detail side elevational view of the control head;

FIG. 23 is a plan diagram of an hydraulic circuit;

FIG. 24 is a plan diagram showing the spotting drive hydraulic system and the hydraulically actuated brakes;

FIG. 25 is a detail view to larger scale of the three-way two-position valve indicated in FIG. 24;

FIG. 26 is a detail view to larger scale of the brake valve indicated in FIG. 24; and FIG. 27 is a detail view to larger scale of the four-way valve indicated in FIG. 24.

This invention proposes an hydraulically operated twin drop-head power ballaster having a complete tamper mechanism on each side of the machine disposed adjacent to each rail and located in front of one end of the machine ahead of the supporting wheels so that during the tamping operation the weight of the machine is fully supported on crossties under the rails that have been tamped in place. The twin tamping mechanisms are adapted to operate independently of each other or simultaneously and the power for the tamping operation is obtained at each of the tamper mechanisms by means of the respectively associated free falling guided drop-head member. Each tamping mechanism comprises a plurality of tamping bars and a linkage arrangement adapted to deliver elliptic type tamping blows to the ballast at opposite sides of the crosstie on each side of the rail. The tamping operation is accomplished by means of hydraulic cylinders which lift the respective drop-heads and automatically release them to drop toward the ballast. The vertical stroke of each drop-head may be adjusted to suit ballast conditions and is controlled by means of a trip-operated pilot valve mounted on the frame of the machine and actuated by the vertical movements of the respective drop-heads. Motive power to propel the machine and to operate the high capacity hydraulic system is provided by internal combustion engine. The hydraulic system operates the drop-heads and associated tamping mechanisms, the braking system and an auxiliary spotting drive for propelling the machine from crosstie to crosstie during the tamping operations.

In the drawings, 10 represents a railway power ballaster having a frame 11, including hollow longitudinal members 12 and transverse members 13 and having a cab 14 enclosing an operator's seat 15 and the control head 16. The operator's seat may be turned to face in either direction for operating the tamping mechanisms in one position or for driving the machine during travel to the work location in the other position. An enclosure 17 (see FIGS. 1 and 2) houses an internal combustion engine 18 (see FIG. 24) which provides the power for propelling the machine and energizing the hydraulic system. The ballaster frame is supported on track wheels 19 running on rails 20 supported on crossties 21 carried in ballast 22 forming the roadbed of the railway. Set-off wheels 23 are provided for setting the machine off of main line rails to permit passage of through trains while the ballaster may be working on the roadbed under traffic conditions. Hydraulically actuated jack mechanism 24 functions in conjunction with the set-off wheels to raise the machine while set-off rails are set under the wheels.

Figure 1:
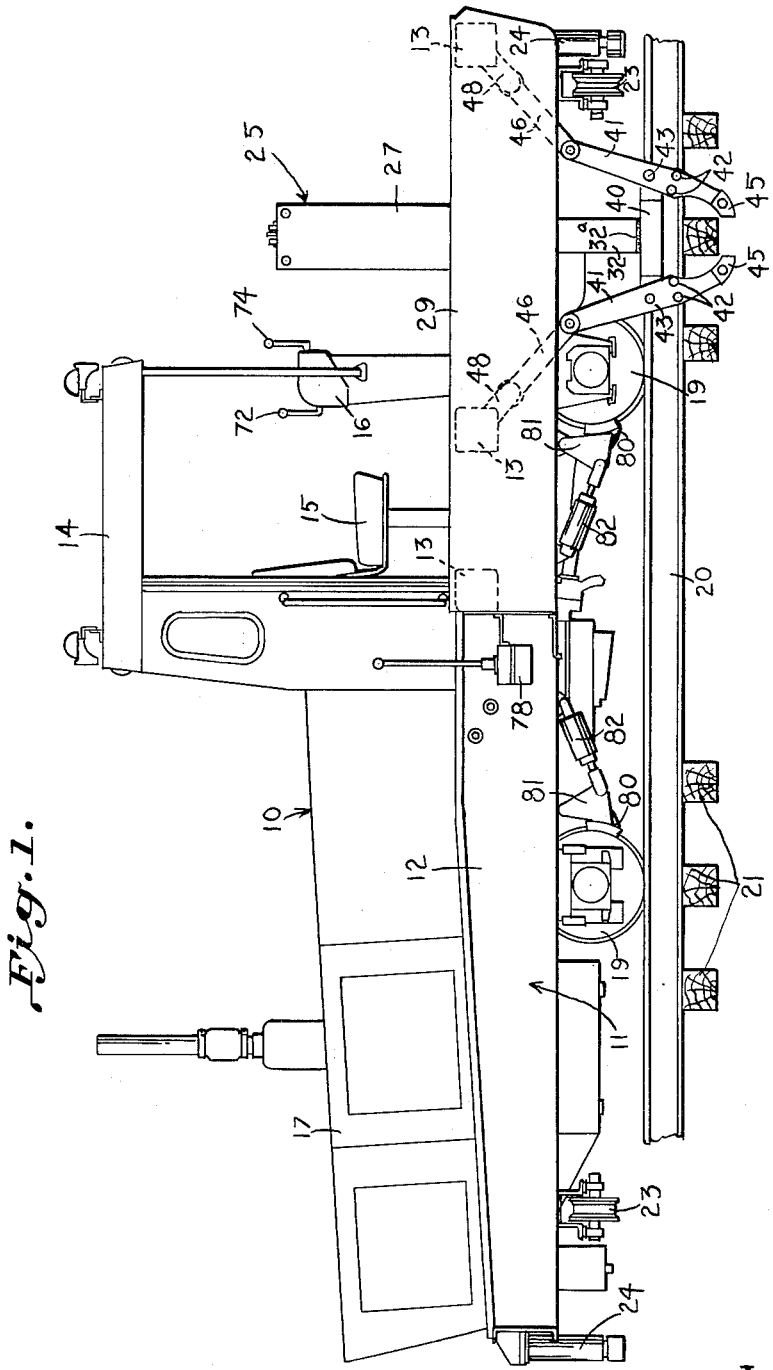
FIG. 1 is a side elevational view of a railway power ballaster machine constructed according to this invention.
Figure 3:
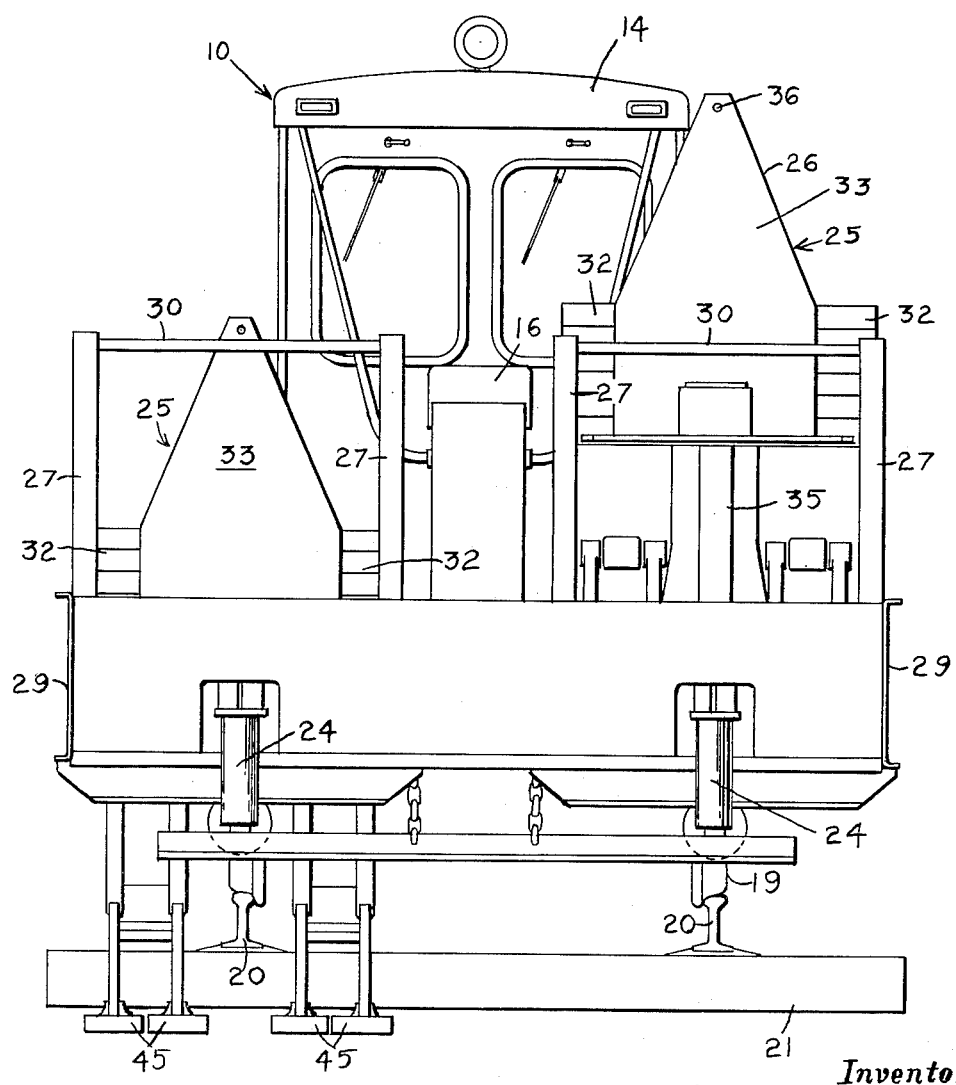
FIG. 3 is an end elevational view of the machine showing one of the drop-heads and associated tamping mechanism in the lowered position and the other in the raised position.

The drop-head and tamping mechanism is indicated generally at 25 and it will be noted that the entire mechanism is so located in front of the supporting wheels 19 that the machine is always fully supported on tamped track and the tamping operation is performed in the ballast at a crosstie ahead of the area supporting the machine. The weight of this overhanging portion required at the front of the machine by the tamping mechanism is counterbalanced by the overhang at the rear of the machine containing the engine and other equipment as best indicated in FIG. 1. The tamping mechanism is duplicated at each side of the machine to provide twin assemblies adapted to tamp the ballast adjacent each rail independently or simultaneously and only one of the assemblies will be described in detail. Each tamping assembly includes a free falling drop-head 26 which is guided for vertical reciprocation in upright guide structures 27 secured to the frame 11 through the medium of outwardly disposed longitudinal members 29 at the respective outer sides (see FIG. 3) and to longitudinal members 28 at the respective inner sides (see FIG. 2) which with the crossmembers 13 form rectangular frame openings in which the respective tamping assemblies are disposed, as best illustrated in FIG. 2.

The guide arrangement for each tamping assembly includes the upright guide structures 27 forming channel shaped guideways for the drop-head and each of these upright structures is comprised of the channel beam 27 which are secured to the longitudinal frame members 28 and 29 as shown in FIGS. 6 and 7 and having angle sections 27ª secured in opposed relation to the respective flanges and to the web portion of the beams whereby to form a box section at each side of the beam and thereby provide a vertical slideway 27ᵇ therebetween in which the drop-head slides (see FIG. 9). Spacing sleeves 30 are disposed between opposing guide structures to provide the proper alignment and spaced relationship of the vertical guideways and having connecting rods or bolts 31 extending through the sleeves and guide structures and secured by nuts 31 whereby to maintain the guideways in horizontally spaced relationship to provide parallel vertical runways for the drop-head as it is reciprocated vertically to actuate the tamping mechanism. The drop-head 26 is comprised of a pair of spaced billets 32 fitting in the guideways and with suitable wearplates 32ᵇ and 27ᶜ forming the contacting surfaces between the billets and runways as best shown in FIG. 9 and having front and rear connecting plates 33 secured to the billets by welding and which integrate the drop-head billet structure into a unitary assembly. The plates 33 are connected at the top thereof to the piston rod 34 of an hydraulic cylinder 35 by means of a spherical type pin 36 secured by cotter key, which provides a pivotal connection and permits of some universal action of the drop-head relative to the piston rod within the clearance afforded by the plates 33, all as best shown in FIG. 8. The hydraulic cylinder 35 is disposed vertically between the spaced billets of the drop-head and enclosed by the plates 33 and is mounted at its bottom end on the frame of the power ballaster so that when the cylinder is filled with fluid the piston rod is actuated upwardly to raise the drop-head and since the hydraulic fluid under pressure in the cylinder comprises the only operating support for the drop-head in its raised position, when the hydraulic fluid is released from the cylinder the drop-head is permitted to fall free without any resistance. The drop-head thus is supported or suspended from the top of the hydraulic cylinder and, of course, is operated by the hydraulic cylinder. The cylinder actually is mounted on top of a pilot operated relief valve more fully hereinafter referred to and the relief valve is supported for some universal movement on an extension provided on the frame. Adjacent the bottom of the cylinder a sandwich type rubber bumper gear unit 36ª is provided which is disposed around the cylinder and which is adapted to cushion the downward fall of the drop-head at the bottom of its tamping stroke. The cushion gear is enclosed by housing 37 formed adjacent the bottom of the plates 33. The gear consists of several sandwich type rubber springs applied one on top of the other around the hydraulic cylinder between the bottom flange on the cylinder and the top of the housing 37 and is particularly adapted to absorb any final shock caused by the downward fall of the drop-head. Where added weight may be desired for impacting the tamping mechanism into the ballast, additional plates 38 may be provided on the billets 32 and which are secured by bolts 39.

Figure 4:
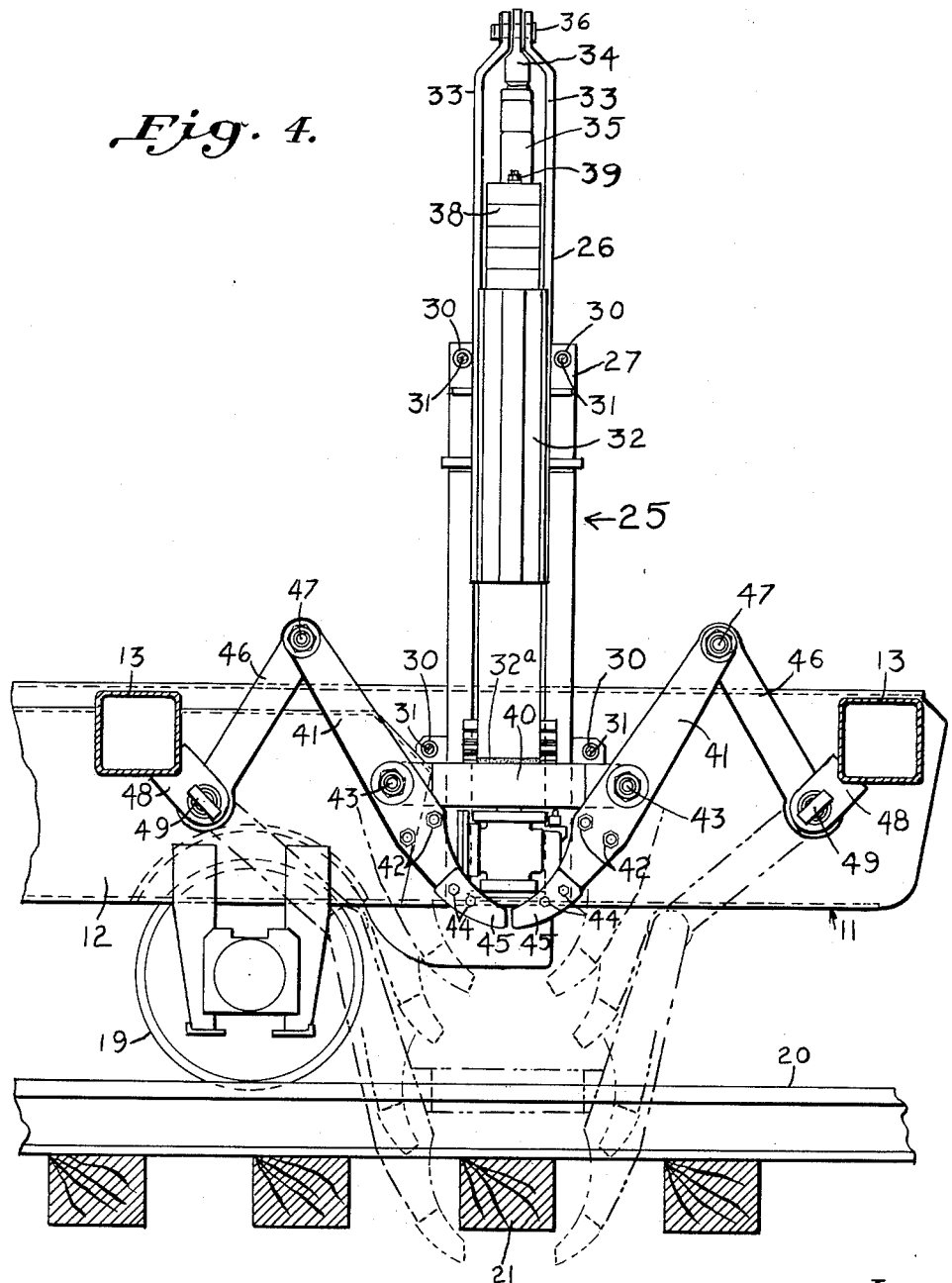
FIG. 4 is a detail sectional view taken on the line 4—4 of FIG. 2 to larger scale showing a drop-head and associated tamping bar mechanism in the raised position and indicating various operating positions of the tamping bars in broken lines.

The drop-head billets 32 each extend downwardly at respective sides of the cylinder 35 and have a bottom trunnion plate 40 secured to the underside of each billet by welding 32ª and extending beyond the front and rear faces of the billet to provide an integrated structure for attachment of the tamping linkage mechanism as best indicated in FIGS. 4 and 5. The tamping mechanism includes a pair of tamping bars 41 pivotally connected intermediate their ends on each end of the trunnion plate 40 by means of bolts 43 whereby to provide four tamping bars associated with each of the billets on the drop-head (see FIG. 2) comprised of a pair of tamping bars at the front and rear of each billet 32 adapted to swing transversely of the drop-head. This arrangement provides pairs of tamping bars disposed in opposed relation at opposite sides of the tie 21 being tamped and both inside and outside of the rail 20 so that each drop-head actuates a total of eight tamping bars arranged for most effective tamping of the ballast 22 under both sides of the crosstie adjacent to both sides of the rail. Each pair of tamping bars 41 is connected together below the intermediate pivot connection to the trunnion plate 40 by means of two spacer bolts 42. Each tamping bar 41 is provided at its lower end with a removable tamping shoe 45 which is interlocked with the end of the tamping bar and securely locked by means of bolt connection 44.

Each pair of tamping bars 41 is pivotally mounted intermediate the ends thereof on the trunnion plate 40 as described and is connected at the upper end thereof to the adjacent crossbar 13 of the frame by means of a link 46. The link 46 is pivotally connected between the respective pair of tamping bars at their upper end by means of pivot bolt 47 and at its other end is pivotally connected to the crossbar through the medium of a clevis 48 and a spherical type pivot bolt 49 which provides a universal connection to the frame. This arrangement with the tamping bars 41 pivotally mounted on the trunnion plate 40 of the drop-head billet 32 causes the tamping bars to be raised with the drop-head and by reason of the connection to the frame crossmember 13 through the medium of the link 46 also controls the directional movement of the tamping bars during the free fall of the drop-head and causes the tamping shoe to move in an elliptical path and imparts increased horizontal thrust to the shoes in the final portion of the downward stroke to compact the ballast under the crosstie as best indicated in FIG. 4 where several positions of the tamping bars during the downward stroke are shown in broken lines and the fully raised position in full lines. The tamper assembly is supported by the hydraulic cylinder 35 and in operation is raised thereby to the uppermost position and when the hydraulic fluid is released from the cylinder, the tamper mechanism is thus allowed to fall free and the weight of the drop-head impacts the tamping bars into the ballast.

The cylinder 35 is mounted directly on a pilot operated relief valve 50 (see FIG. 8) which is mounted in direct connection with the frame of the machine which itself comprises the hydraulic sump. The mounting of the relief valve, it will be noted, is on a spherical seat 51ª whereby the cylinder 35 is permitted limited universal movement in the raising and lowering of the tamping mechanism. The relief valve is applied on the top of an extension 51 forming a part of the frame construction and which is actually a continuation of the respective hollow longitudinal frame members 12. These hollow frame members constitute the sump for the hydraulic system and afford a reservoir of adequate capacity and having extended surfaces for cooling the hydraulic fluid. The pilot operated relief valve 50 and the cylinder 35 are directly in line with the frame longitudinals 12 and these longitudinals are located directly over the respective rails 20. The relief valve, therefore, by reason of its direct communication with the sump may release the fluid from the cylinder 35 directly into the sump and permit the free fall of the drop-head without any back pressure from the hydraulic fluid and with minimum resistance. The pilot operated relief valve contains a balanced piston 52 adapted to be vented for unloading and controlled by trip-operated pilot valve more fully hereinafter referred to. The inlet port 53 of the valve is at the bottom and is connected to an hydraulic pump by means of a feed line pipe 54 which communicates with one or the other of the two main circuits 67 or 68 as the case may be.

The outlet port 55 is disposed on the side of the valve adjacent the sump in the frame and the connection between the valve and the sump for returning the fluid from the cylinder 35 through valve 50 to the sump is made by means of a flexible connector 56 extending between the valve and the sump and securely attached to the opposing faces of both by clamping rings 58 and cap screws 58ª.

Operation of the relief valve 50 is controlled by trip-operated pilot valve 57 as shown in FIGS. 10 through 16 and which is mounted on the vertical guide structure 27 by means of socket-head bolts 58ᵇ. The valve 57 is provided with trip levers 59 and 60 for actuation by the drop-head on the down stroke and up stroke respectively. The pilot valve 57 also is utilized to control the depth of the stroke of the drop-head and provides for adjustment of the stroke by means of fixed and adjustable tripping members 61 and 62 which are mounted on the adjacent face of billet 32 at the outer side of the machine. The upper member 61 comprises the fixed tripping member and consists of an angle member secured to the face of the billet member by countersunk machine screws and having its outwardly directed flange affording an extended tripping surface adapted to engage the trip lever 59 on the valve to actuate the valve on the down stroke. The lower member 62 comprises the adjustable tripping member to provide for varying the vertical stroke of the drop-head in accordance with the conditions of the ballast to be tamped. This member consists of an outstanding lug on a slide member 63 which is slidably mounted in a slotted member 64 mounted within the face of the billet 32 and secured by welding. The slide member 63 as best shown in FIG. 16 is adjustably secured by machine bolts 65. The various valves used in the hydraulic system all are of standard commercial type well-known in the art and readily available in the open market so that a detailed description of the specific features is believed to be unnecessary.

The hydraulic system for the machine includes three main circuits, two for operation of the drop-head and tamper mechanisms and the jacks for the set-off arrangement and one for operation of the hydraulic spotting drive and to actuate the brakes. A triple-gear pump unit 66 operating simultaneously and driven by the engine 18 provides pressure for the system. Two of the pumps are used for operating the drop-heads (one for each drop-head) and the set-off jacks, and the third pump is used for operating the hydraulic spotting drive motor and the brake system. The two main circuits 67 and 68 for the drop-head and associated tamper mechanisms are identical, with each one starting from one of the pump units as shown in FIG. 23 and leading to the respective drop-head cylinders 35 through the relief valves 50. Included in each circuit is a relief valve 69 adapted to return the fluid to the sump when the pump is operating and the tamping operation is not being performed. A two-way two-position valve 70 controlling the venting of the relief valve 69 is provided in each circuit and is located in the cab 14 on the control head 16 for operation of the tamper mechanism. The two circuits are connected through a four-way three-position open-center manually operated valve 71 for synchronizing the two drop-heads and tamper mechanisms during tamping operations. With this valve in the one extreme position, closed, the drop-heads may be operated individually and in the other extreme position of the valve the drop-heads are locked in their uppermost positions, while in the valve's intermediate position, the drop-heads may be reciprocated simultaneously (see FIGS. 21 and 22).

When it is desired to tamp the ballast, the engine 18 is set to operate the hydraulic pump at a governed speed and while the engine is running, before the tamping operation is started, the hydraulic fluid will circulate from the pump through the internally piloted relief valves 69 and return to the sump or reservoir 12. To start the tamping operation the operator actuates the control handle 72 for the respective pilot valve 70. A control handle is provided for each of the valves 70 and one valve controls the hydraulic cylinder 35 for the left-hand drop-head while the other valve controls the cylinder for the right-hand drop-head. When the control handle is pushed in as shown in FIG. 22 the pilot valve 70 acts to close the vent of its internally piloted relief valve 69 which thereupon directs the main flow of the hydraulic fluid into the drop-head cylinder 35 through the valve 50. When the piston in the cylinder 35 nears the top of its stroke, the valve 57 is tripped which acts to bleed the internally piloted relief valve 50 through pilot line 73 to unload the balanced piston 52 and thereby release the fluid in the cylinder 35 to flow through the outlet port 55 directly into the sump and permit the drop-head to fall free without any back-pressure from the fluid and impact the tamping bars 41 into the ballast. Opening and closing of the relief valve 50 is controlled by the trip-operated valve 57 and the extent of the free fall or vertical stroke of the drop-head is determined by the location of the adjustable bottom trip member 62. When the drop-head reaches the bottom of its free fall the member 62 trips the valve 57 which acts to close the relief valve 50 and thus limit the vertical stroke of the piston in the cylinder 35. As best illustrated in FIG. 23 the bleeding of the internally piloted relief valve 50 is effected through pilot line 73 which connects the valve 50 with the valve 57 passing through the pilot valve 71 and to the sump formed in the hollow longitudinal frame members 12. When the control handle 74 on the pilot valve 71 is in the center position as shown in FIG. 22 the drop-heads will reciprocate simultaneously but when the control handle is pulled toward the operator the drop-heads may be operated independently of each other. When the control handle is pushed away from the operator both of the drop-heads will rise to their uppermost position and remain there.

A manually-operated latch is provided for each drop-head to hold the drop-head and associated tamping mechanism in the raised position to relieve the hydraulic cylinders 35 of this weight during travel of the machine to and from the ballasting location. This positive mechanical lock is shown in FIGS. 17, 18 and 19. The drop-head 26 is provided with a projecting lug 74 which is welded to the face of the drop-head billet and located adjacent to the guide structure 27. A pivoted locking dog 75 is mounted on the guide structure in position to engage under the lug 74 when swung to the operative position and it will be noted that when the locking dog is engaged under the lug it is disposed beyond dead center so that the weight of the drop-head maintains the locked relationship of the dog under the lug. A lever member 76 extends outwardly from the locking dog and a weighted operating handle 77 is suspended from the outer end of the lever. This handle affords a safe and convenient means for the operator to engage the locking dog under the supporting lug and when the drop-head is raised slightly by the hydraulic cylinder 35 the weight of the handle will cause the locking dog 75 to release automatically.

The set-off arrangement for the machine including the set-off wheels 23 and the four hydraulic jacks 24 provides for removal of the machine from the rails 20 when required and the jacks 24 are operated from the hydraulic tamping circuit by means of a branch circuit (not shown) from one of the two tamping circuits. The branch circuit would include a manually-operated four-way closed center type valve for operation of the jacks but since this arrangement forms no part of the present invention the parts have not been illustrated. A manually-operated hydraulic pump 78 (see FIG. 1) is provided for emergency operation and is connected to both of the tamper circuits as by the lines 79 (see FIG. 23) and to the branch set-off circuit referred to.

The brake arrangement for the machine consists of a single cast iron combination brake-shoe and brake-head 80 at each wheel supported from the underside of frame members 12 by means of two triangularly shaped hangers 81 disposed on respectively opposite sides of each brake-head and carrying the brake-head therebetween by means of a pivot bolt. The hangers are pivotally connected to the underside of the frame and the brake-head is held in position for proper relationship of the brake-shoe to the wheel by conventional friction-type spring steel washers disposed between the head and the hangers. The brakes are hydraulically actuated and an hydraulic cylinder 82 is provided at each brake, operatively connected between the brake hangers and the frame 12 so that the reaction from the forces of a brake application are between the brakes and the underside of the frame, all as best shown in FIG. 1. Brake application during travel of the machine is provided for by manually-operated variable pressure brake valve 83 but the brakes are adapted to operate in conjunction with an hydraulic spotting drive for the machine during tamping operations at which time the brake valve is set for the desired pressure and the brakes are applied by piloted spring off-set valve 89 controlled by the pilot circuit of the hydraulic drive.

The hydraulic circuit 84 for the hydraulic drive and the brake system originates at one of the units of the triple-gear pump 66 and leads to the hydraulic motor 85 through a balanced piston type relief valve 86 having a vent used for unloading. A pilot hydraulically-operated four-way valve 87 also is provided in the circuit and is controlled from a manually-operated three-position valve 88 having an integral two-way venting valve operated simultaneously and which is located in the cab 14. Two positions of this valve operate forward and reverse travel of the machine by changing the rotation of the motor 85 and the central position applies the brakes acting through the three-way brake valve 83. When the machine is traveling to and from the work location, hydraulic pressure for the brake system is provided by the hydraulic pump 66 operated in conjunction with the engine 18. The handle 90 of the selective flow directional valve 88 is first pushed to the in position and the directional valve then directs the fluid pilot flow from the internally piloted relief valve 86 to a pressure differentially-operated unloading or by-pass valve 91 which remains closed until sufficient pressure has been built up in the accumulator 92. When the pressure has been built up in the accumulator the by-pass valve 91 vents the internally piloted relief valve 86 and allows the main flow of the hydraulic fluid to circulate back to the sump.

At the work location the brake controls are set to operate in conjunction with the hydraulic motor drive by pulling the handle 90 of the selective flow directional valve 88 to the out position as shown in dotted line in FIG. 25. The brake valve 83 is then set for the braking pressure desired during the tamping operation by adjusting the position of the handle 93 of the brake valve. When the machine is traveling to or from the work location the brakes may be applied by manually operating the handle 93. The hydraulic motor 85 is supplied with fluid pressure by pilot-operated valve 94 which is remotely controlled by the manually-operated pilot valve 89 which also controls brake application during the tamping cycle. For brake applications during the tamping operation, the handle 95 of pilot valve 89 may be moved in either direction as indicated in FIG. 27 to supply pilot pressure to the pilot-operated valve 94 and to the pilot-operated valve 87. The valve 94 then supplies fluid pressure to operate the hydraulic motor 85 and at the same time, the valve 87 releases the brakes. When the handle 95 of the pilot valve 89 is in the intermediate or spring-return position as shown in FIG. 27 fluid pressure is relieved from the hydraulic motor and the brakes are applied by pressure supplied from the accumulator 92.

The hydraulic motor 85 operates to propel the machine from crosstie to crosstie during tamping operations and drives the propeller shaft of the machine through a chain and sprocket driving connection generally indicated at 96 which represents a housing enclosing the arrangement. A jaw clutch (not shown) is provided in the housing to disengage the chain drive during high speed travel of the machine. When the auxiliary drive is being used, the engine 18 is disengaged from the mechanical drive train utilized for propelling the machine during high speed travel. The drive train connects the engine 18 mechanically with the axle adjacent to the tamping mechanism and includes a heavy duty clutch in the bell housing 97, a reversing transmission 98, three-speed transmission 99, rear-axle gear box 100 and suitable propeller shafts 101 to provide a direct driving connection between the engine and driving axle. The auxiliary chain drive unit is located between the reversing transmission and the three-speed transmission. The engine 18 is disengaged from the drive train at the neutral position in the reversing transmission when the auxiliary drive is being used. The hydraulic motor 85 operates in two directions by means of a control valve in the cab 14 to provide for forward and reverse travel.

From the foregoing it will be seen that there has been provided a railway power ballaster machine having hydraulically operated twin tamper mechanisms located one on each side of the machine above each rail and each actuated in the tamping stroke by a guided free falling drop-head which is raised by an hydraulic ram and wherein the tamping mechanism is comprised of tamping bars pivotally connected to the drop-head and having linkage connection with the machine whereby elliptical tamping blows are imparted to the ballast at opposite sides of a crosstie and on each side of each rail, adapted to operate either simultaneously at both sides of the machine or independently as required and having a synchronized hydraulic drive and brake arrangement for spotting the tamping mechanism in relation to the crossties.

What is claimed is:

1. In a power ballaster for tamping a railway road bed the combination comprising a machine having a frame including longitudinally spaced transverse members and supporting wheels, a vertically reciprocable drop-head having a front side and a rear side disposed transversely of said machine and operatively mounted on said frame between said transverse members, a tamping bar at each of said front and rear sides of said drop-head and each being disposed vertically and pivotally mounted intermediate its ends to said drop-head, said tamping bars being swingable in longitudinal direction relatively to said machine, links adjacent both said front and rear sides of said drop-head respectively pivotally connecting the upper ends of said tamping bars to the transverse members of said frame, and means on said frame for raising said drop-head and tamping bars relatively to said frame and releasing them to fall free whereby to impact the lower ends of said tamping bars into the road bed with the links providing guiding means for operatively swinging said tamping bars in a controlled path of movement in response to rising and falling movement of said drop-head.

2. In a power ballaster for tamping a railway road bed the combination comprising a machine having a frame including longitudinally spaced transverse members and supporting wheels, a vertically reciprocable drop-head having a front side and a rear side disposed transversely of the machine and operatively mounted in said frame between said transverse members, said drop-head comprising a pair of spaced billets integrated by front side and rear side connecting plates and having a connecting member above the level of the billets, a bottom trunnion plate on each billet, a pair of tamping bars at each said billet on both said front and rear sides of said drop-head and each said bar being disposed vertically and pivotally mounted intermediate its ends on one end of each said trunnion plate for swinging movements in longitudinal direction relatively to the machine and in opposed relation as between the pairs of tamping bars at respectively opposite said front and rear sides of said drop-head, a link between each pair of tamping bars adjacent both said front and rear sides of said drop-head respectively pivotally connecting the upper ends of the tamping bars to the transverse members of said frame, a cylinder supported on said frame extending vertically between said billets and enclosed by said connecting plates and operatively secured to said connecting member of said drop-head to raise the drop-head and tamping bars relatively to said frame, and a relief valve directly associated with said cylinder to release the supporting pressure therein and cause the free fall of the drop-head to impact the lower ends of the tamping bars into the road bed, said pivotal connection of the opposite ends of said links to said tamping bars and to said frame respectively providing guiding means for operatively swinging said tamping bars in a controlled path of movement in response to rising and falling movement of said drop-head and causing the tamping bars during the free fall to impact increased horizontal tamping thrust into the road bed in the lower and final portion of the fall.

3. In a power ballaster for tamping a railway road bed the combination including a machine having a hollow frame comprising an hydraulic sump and longitudinally spaced transverse framing members, supporting wheels for the machine, a vertically reciprocable drop-head having a front side and a rear side disposed transversely of the machine and operatively mounted in said frame between said transverse framing members, said drop-head comprising a pair of spaced billets integrated by front side and rear side connecting plates and having a connecting member above the level of the billets, a bottom trunnion plate on each billet, a pair of tamping bars at each said billet on both said front and rear sides of said drop-head and each said bar being disposed vertically and each said pair of bars being in longitudinal direction relatively to the machine pivotally mounted intermediate their ends on each end of each of said trunnion plates for swinging movements in opposed relation as between the pairs of tamping bars at respectively opposite said front and rear sides of said drop-head, a link between each pair of tamping bars adjacent both said front and rear sides of said drop-head respectively connecting the upper ends of the tamping bars to said transverse framing members, said frame having an extension communicating with said sump, said extension having an upwardly facing spherical seat portion, a relief valve mounted on said spherical seat of said extension, and a hydraulic cylinder supported on said relief valve and extending vertically between said billets and enclosed by said connecting plates and operatively secured to said connecting member of said drop-head by means of a spherical pin to provide a pivotal connection whereby said pivotal connection in conjunction with said lower spherical seat support provides some universal movement of the drop-head relatively to said cylinder during vertical movements of the drop-head, said relief valve acting to release the hydraulic pressure in said cylinder and discharge the hydraulic fluid in the cylinder into said sump to cause the free fall of the drop-head to impact the lower ends of the tamping bars into the road bed, said links operatively swinging said tamping bars in a controlled path of movement in response to rising and falling movement of said drop-head and causing the lower ends of said bars to move in an elliptical path to impart increased horizontal tamping thrust into the road bed in the lower and final portion of the fall.

4. In a power ballaster for tamping a railway road bed the combination claimed in claim 1 including a pair of laterally spaced drop-heads, one at each side of the machine, and a pair of laterally spaced tamping bars mounted at each of said front and rear sides of each drop-head, each laterally spaced pair of tamping bars being adapted to straddle a rail supporting the adjacent wheel of the machine.

References Cited in the file of this patent

UNITED STATES PATENTS

| | | |
|---|---|---|
| 1,556,604 | Jackson | Oct. 13, 1925 |
| 1,731,023 | Peterson | Oct. 8, 1929 |
| 2,482,123 | Philbrick | Sept. 20, 1949 |
| 2,482,796 | Philbrick | Sept. 27, 1949 |
| 2,536,887 | Philbrick | Jan. 2, 1951 |
| 2,696,792 | Philbrick | Dec. 14, 1954 |
| 2,789,516 | Hursh et al. | Apr. 23, 1957 |
| 2,821,935 | Bean | Feb. 4, 1958 |
| 2,843,055 | Hursh et al. | July 15, 1958 |